United States Patent Office 2,848,492
Patented Aug. 19, 1958

2,848,492
PREPARATION OF MIXED ANHYDRIDES OF PHOSPHORAMIDIC ACIDS

George A. Saul, Nitro, W. Va., and Philip C. Hamm, Webster Groves, Mo., assignors to Monsanto Chemical Company, St. Louis, Mo., a corporation of Delaware No Drawing. Application February 28, 1955
Serial No. 491,190

14 Claims. (Cl. 260—545)

The present invention relates to a process of preparing mixed anhydrides of a carbon acid and a phosphoramidic acid and to new compounds. By carbon acid is meant an acid characterized by the presence of a carbonyl or thiocarbonyl group.

It is an object of the present invention to provide a process generally applicable for preparing mixed anhydrides of phosphoramidic acids. A specific object of the invention is to provide a process for the preparation of mixed anhydrides from a halide of a carbon acid and an ester of a phosphoramidic acid. Another particular object is to provide a method suitable for the preparation of mixed anhydrides of phosphorodiamidic acids. Still another object is to provide a new class of mixed anhydrides of a carbon acid and a phosphorodiamidic acid. Another object is to provide new mixed anhydrides of phosphorodiamidic acid which are very effective herbicides. Other objects will be apparent from the detailed description.

While preparation of mixed anhydrides by reaction of a phosphoramidic dichloride with the sodium salt of a carbon acid has been proposed, investigation of the phosphorodiamidic chlorides led to the conclusion that they were much less reactive than had been supposed. However, it was discovered that reaction readily occurred between an ester of a phosphorodiamidic acid and a carbon acid halide to yield the desired mixed anhydrides. The process is indeed simple. No solvent is necessary although use of one is not precluded. A preferred embodiment of the invention is to heat an admixture of the aforesaid reactants until the theoretical amount of by-product halide is evolved. The product is then purified by distillation or where applicable by recrystallization or by other means but is often of sufficient purity for use directly. The yields are usually essentially quantitative.

The process is preferably carried out with a lower alkyl ester of one to four carbon atoms. The lower alkyl esters of phosphorodiamidic acids may be prepared by the method of David and Kilby, Nature, vol. 164, pp. 522-3 (1949). The reaction involved is sodium alcoholate on the phosphorodiamidic halide.

The process is applicable to the preparation of compounds characterized by the presence of the following mixed anhydride nucleus:

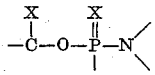

where X represents oxygen or sulfur. As noted it is particularly advantageous for the preparation of mixed anhydrides of phosphorodiamidic acids or in other words compounds in which the dangling valence on the phosphorus is connected to another nitrogen.

Apparently any of the carbon acid halides undergo reaction but the chlorides are satisfactory and are of course most economical to use. Suitable examples of carbon acid chlorides comprise acetyl chloride, alpha-toluyl chloride, monochloracetyl chloride, dichloroacetyl chloride, propionyl chloride, butyryl chloride, isobutyryl chloride, valeryl chloride, benzoyl chloride, p-nitrobenzoyl chloride, p-chlorobenzoyl chloride, maleyl chloride, succinyl chloride, oxalyl chloride, malonyl chloride, glutaryl chloride, adipyl chloride, diethylcarbamyl chloride, diethylthiocarbamyl chloride, dimethylcarbamyl chloride, dimethylthiocarbamyl chloride, dipropylthiocarbamyl chloride, di-isopropylthiocarbamyl chloride, dibutylthiocarbamyl chloride, di-isobutylthiocarbamyl chloride, alpha-chloropropionyl chloride, alpha-chlorobutyryl chloride, bromacetyl chloride, fluoracetyl chloride, iodoacetyl chloride, and alpha-bromopropionyl chloride.

Other phosphoramidates may be utilized, as for example methyl tetramethylphosphorodiamidothionate, methyl tetraethyl phosphorodiamidothionate, ethyl tetraethylphosphorodiamidate, ethyl tetrapropylphosphorodiamidate, ethyl tetraisopropylphorodiamidate and ethyl tetrabutylphosphorodiamidate.

So far as is known the mixed anhydrides of phosphorodiamidic acids and carbon acids have not heretofore been described. These compounds have important industrial applications. They comprise intermediates, herbicides, insecticides and have other uses. A new class of mixed anhydrides which are outstanding grass specific herbicides are characterized by the structure

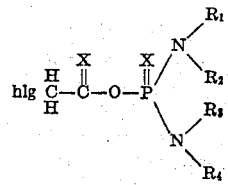

where X represents oxygen or sulfur, hlg represents halogen and $R_1$, $R_2$, $R_3$ and $R_4$ represent aliphatic radicals containing more than 1 but preferably less than 6 carbon atoms, as for example unsubstituted alkyl, substituted alkyl, and alkenyl radicals. The tetramethyl compounds ($R_1$, $R_2$, $R_3$ and $R_4$=methyl) are active but to a significantly less degree. Typical examples of $R_1$, $R_2$, $R_3$ and $R_4$ comprise ethyl, propyl, isopropyl, butyl, chloroethyl, chloropropyl, cyanoethyl, hydroxyethyl, allyl, 2-chloroallyl, 3-chloroallyl and 3-chloro-2-butenyl radicals. These compounds are especially active in pre-emergence application. For example, in pre-emergence application the mixed anhydride of tetraallylphosphorodiamidic acid and chloracetic acid destroyed all grasses at 2½ pounds per acre.

As exemplary of the invention the following are illustrative and are not to be construed as limitative thereof.

Example 1

To 90.1 grams (0.5 mole) of ethyl tetramethylphosphorodiamidate was added 75.8 grams (0.5 mole) of diethylthiocarbamyl chloride, causing the temperature to drop from 22° C. to 10° C. The mixture was then heated to 148° C. in twenty minutes at which time gas evolution was observed and the reaction became slightly exothermic. Heating was continued for two hours at 150–160° C. at which time the theoretical quantity of ethyl chloride had been evolved. Heating was then discontinued and the product cooled to yield a dark liquid. Analysis of the crude filtered product, the anhydride of diethyl thionocarbamic acid and tetramethylphosphorodiamidic acid, gave 12.0% phosphorus and 16.0% nitrogen as compared to 11.6% phosphorus and 15.7% nitrogen calculated for $C_9H_{22}N_3O_2PS$.

Example 2

To 108.0 grams (0.6 mole) of ethyl tetramethylphosphorodiamidate at 60° C. was added 56.5 grams (0.5 mole) of chloracetyl chloride, causing the temperature to rise to 105° C. in seven minutes. The mixture was then cooled to 70° C. by means of an ice bath. Over a period of ten minutes the temperature was then brought back to 100° C. and held there for about five hours or until the theoretical quantity of ethyl chloride was evolved. The final weight loss was 34 grams (theory= 32.25 grams). After filtration through paper the anhydride of tetramethylphosphorodiamidic acid and chloracetic acid was obtained as a mobile dark red liquid. Analysis gave 14.3% phosphorus, 12.35% nitrogen and 13.6% chlorine as compared to 14.05% phosphorus, 12.68% nitrogen and 13.4% chlorine calculated for $C_6H_{14}ClN_2O_3P$.

*Example 3*

To 60.0 grams (0.33 mole) of ethyl tetramethylphosphorodiamidate was added 61.8 grams (0.33 mole) of p-nitrobenzoyl chloride and the mixture heated slowly until the temperature reached 75° C. Thereupon an exothermic reaction set in which was controlled by external cooling. The reaction mixture was then heated for two and one-half hours at 90–112° C., vacuum being applied during the last hour. The weight loss was 22.2 grams (theory=21.4 grams). The anhydride of tetramethylphosphorodiamidic acid and p-nitrobenzoic acid so obtained was a nearly white solid having a melting point after recrystallization from heptane of 93.8° C. Analysis gave 9.68% phosphorus and 13.63% nitrogen as compared to 10.28% phosphorus and 13.95% nitrogen calculated for $C_{11}H_{16}N_3O_5P$.

*Example 4*

To 93.7 grams (0.25 mole) of ethyl tetramethylphosphorodiamidate maintained at 25–35° C. was added with stirring over a ten minute period 39.3 grams (0.5 mole) of acetyl chloride. The exothermic reaction which set in caused the temperature to rise to 51° C. over a twenty minute period. By intermittent cooling the mixture was held at 40–50° C. for twenty minutes longer. Since the reaction mixture then tended to crystallize the temperature was raised to 120° C. which returned it to a fluid condition. The mixture was maintained at 90–100° C. for about one and three-fourths hours. After the first hour the heating was carried out under reduced pressure (60 mm.) until the theoretical quantity of ethyl chloride was evolved. The weight loss was 32.6 grams (theory= 32.25 grams). The anhydride of acetic acid and tetramethylphosphorodiamidic acid so obtained was a clear dark brown liquid. Analysis gave 13.7% nitrogen and 16.1% phosphorus compared to 14.4% nitrogen and 16.0% phosphorus calculated for $C_6H_{15}N_2O_3P$.

*Example 5*

To 63.2 grams (0.35 mole) of ethyl tetramethylphosphorodiamidate was added dropwise 47.2 grams (0.33 mole) of dichloracetyl chloride. The temperature during the addition was held below 10° C. by means of an ice bath. The mixture was then heated and when the temperature reached 82° C. an exothermic reaction set in causing the temperature to rise above 125° C. in two minutes. Heating was discontinued and when the temperature had dropped to 90–100° C., this temperature was maintained for three and one-half hours. The product was then cooled to room temperature and kept under diminished pressure for one-half hour. The weight loss was 20.3 grams or about 95% of theory. The mixed anhydride of dichloracetic acid and tetramethylphosphorodiamidic acid so obtained was a dark brown pungent liquid. Analysis gave 11.2% phosphorus as compared to 11.8% calculated for $C_6H_{13}Cl_2N_2O_3P$.

*Example 6*

To 54.3 grams (0.191 mole) of ethyl tetraallylphosphorodiamidate maintained at 27° C. was added 19.2 grams (0.17 mole) of chloracetyl chloride. The temperature rose rapidly to 35° C. and was reduced to 30° C. by means of an ice bath. When no further heat evolution was apparent, the mixture was heated gradually to 93° C. over the next ninety minutes and then maintained at 94–95° C. for an additional sixteen hours. The weight loss was 10.2 grams. The mixed anhydride of chloracetic acid and tetraallylphosphorodiamidic acid so obtained was a brown liquid. Analysis gave 10.9% chlorine, 10.6% phosphorus and 8.0% nitrogen as compared to 10.7% chlorine, 9.3% phosphorus and 8.4% nitrogen calculated for $C_{14}H_{22}ClN_2O_3P$.

It is intended to cover all changes and modifications of the examples of the invention herein chosen for purposes of disclosure which do not constitute departures from the spirit and scope of the invention.

What is claimed is:

1. The method of making a mixed anhydride of a carbon acid and a phosphoramidic acid which comprises heating a carbon acid chloride selected from the group consisting of lower fatty acid chlorides, halogen substituted lower fatty acid chlorides, phenyl substituted lower fatty acid chlorides, di(lower alkyl) carbamyl chlorides, di(lower alkyl) thiocarbamyl chlorides, chlorides of the structure

where *n* is an integer from zero to 4 inclusive and maleyl chloride with a lower alkyl ester of a phosphorodiamidic acid of the structure

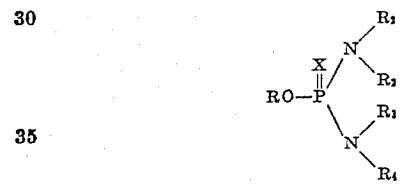

where R represents lower alkyl, X is selected from the group consisting of oxygen and sulfur and $R_1$, $R_2$, $R_3$ and $R_4$ are selected from the group consisting of lower alkyl, chloro substituted lower alkyl, cyano substituted lower alkyl, hydroxy substituted lower alkyl, lower alkenyl and chloro substituted lower alkenyl.

2. The process of preparing a mixed anhydride which comprises heating a lower fatty acid chloride with a lower alkyl ester of a phosphorodiamidic acid the nitrogen valences of which are satisfied by lower aliphatic hydrocarbon radicals and removing alkyl halide.

3. The method of making a mixed anhydride according to claim 2 in which the ester is a lower alkyl ester of a lower tetraalkylphosphorodiamidic acid.

4. The process of preparing a mixed anhydride which comprises heating a halogen substituted lower fatty acid chloride with a lower alkyl ester of a phosphorodiamidic acid the nitrogen valences of which are satisfied by lower aliphatic hydrocarbon radicals and removing alkyl halide.

5. The process of preparing a mixed anhydride according to claim 4 in which the ester is a lower alkyl ester of a lower tetraalkylphosphorodiamidic acid.

6. The process of preparing a mixed anhydride according to claim 4 in which the ester is a lower alkyl ester of a lower tetraalkenylphosphorodiamidic acid.

7. The process of preparing a mixed anhydride which comprises heating chloracetyl chloride with a lower alkyl ester of a lower tetraalkylphosphorodiamidic acid and removing alkyl halide.

8. The process of preparing the mixed anhydride of dichloracetic acid and tetramethylphosphorodiamidic acid which comprises heating dichloracetyl chloride with a lower alkyl tetramethylphosphorodiamidate and removing by-product alkyl chloride.

9. The process of preparing a mixed anhydride which comprises heating chloracetyl chloride with a lower alkyl ester of a lower tetraalkenylphosphorodiamidic acid and removing by-product alkyl chloride.

10. The process of preparing the mixed anhydride of chloracetic acid and tetraallylphosphorodiamidic acid which comprises heating chloracetyl chloride with a lower alkyl tetraallylphosphorodiamidate and removing by-product alkyl chloride.

11. The method of making the mixed anhydride of tetramethylphosphorodiamidic acid and chloracetic acid which comprises heating a lower alkyl tetramethylphosphorodiamidate with chloracetyl chloride and removing by-product alkyl chloride.

12. The method of making the mixed anhydride of tetramethylphosphorodiamidic acid and p-nitrobenzoic acid which comprises heating a lower alkyl tetramethylphosphorodiamidate with p-nitrobenzoyl chloride and removing by-product alkyl chloride.

13. A mixed anhydride of the structure

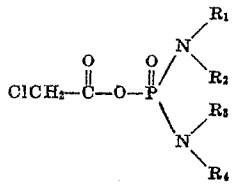

where $R_1$, $R_2$, $R_3$ and $R_4$ represent lower alkenyl radicals containing more than one but less than five carbon atoms.

14. The mixed anhydride of the formula

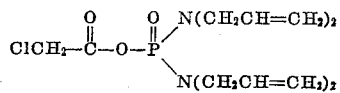

References Cited in the file of this patent

UNITED STATES PATENTS 2,610,139    Dye              Sept. 9, 1952
2,648,696    Whetstone       Aug. 11, 1953

OTHER REFERENCES

U. S. Publications Board, Report No. 87923, pp. 25 and 33 (made available to public April 23, 1948).